(12) United States Patent
Sicken et al.

(10) Patent No.: US 7,439,288 B2
(45) Date of Patent: *Oct. 21, 2008

(54) TITANIUM-CONTAINING PHOSPHINATE FLAME RETARDANT

(75) Inventors: Martin Sicken, Cologne (DE); Elke Schloβer, Augsburg (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 505 days.

This patent is subject to a terminal disclaimer.

(21) Appl. No.: 10/850,245

(22) Filed: May 20, 2004

(65) Prior Publication Data

US 2005/0009941 A1    Jan. 13, 2005

(30) Foreign Application Priority Data

May 22, 2003    (DE) ................. 103 23 116

(51) Int. Cl.
*C08K 5/5313*    (2006.01)
(52) U.S. Cl. .................. 524/126; 524/133
(58) Field of Classification Search ........ 524/126, 524/133
See application file for complete search history.

(56) References Cited

U.S. PATENT DOCUMENTS

| | | | |
|---|---|---|---|
| 3,457,195 A * | 7/1969 | Block et al. ............ | 528/395 |
| 3,900,444 A | 8/1975 | Racky et al. | |
| 4,036,811 A | 7/1977 | Noetzel et al. | |
| 4,049,612 A * | 9/1977 | Sandler ............... | 524/126 |
| 4,078,016 A * | 3/1978 | Kramer ............... | 525/389 |
| 4,180,495 A | 12/1979 | Sandler | |
| 4,208,321 A | 6/1980 | Sandler | |
| 4,208,322 A * | 6/1980 | Sandler ............... | 525/434 |
| 5,773,556 A | 6/1998 | Kleiner et al. | |
| 5,780,534 A | 7/1998 | Kleiner et al. | |
| 6,013,707 A | 1/2000 | Kleiner et al. | |
| 6,207,736 B1 | 3/2001 | Nass et al. | |
| 6,365,071 B1 | 4/2002 | Jenewein et al. | |
| 6,420,459 B1 | 7/2002 | Horold | |
| 6,509,471 B2 | 1/2003 | Hoglen | |
| 6,534,673 B1 * | 3/2003 | Weferling et al. ....... | 562/8 |
| 6,547,992 B1 | 4/2003 | Schlosser et al. | |
| 6,569,974 B1 * | 5/2003 | Sicken et al. ........... | 526/274 |

FOREIGN PATENT DOCUMENTS

| | | |
|---|---|---|
| DE | 2252258 | 8/1974 |
| DE | 2447727 | 8/1976 |
| DE | 19607635 | 9/1997 |
| DE | 19734437 | 2/1999 |
| DE | 19737727 | 7/1999 |
| EP | 0699708 | 6/1996 |
| EP | 1024167 | 8/2000 |
| EP | 1024168 | 8/2000 |
| WO | WO 97/39053 | 10/1997 |

OTHER PUBLICATIONS

EPO Search Report for EP 04011035, Nov. 19, 2004.
Dahl et al., "Inorganic Coordination Polymers, 1X. Titanium (IV) Phosphinate Polymers.," Inorganic Chemistry vol. 6, No. 8 pp. 362-366 (Aug. 1, 1967).
Domininghaus, "Die Kunstoffe undihre Eigenschaften" 5$^{th}$ ed. p. 14 (1998).
U.S. Appl. No. 11/126,981, by Bauer et al., filed May 11, 2005.

* cited by examiner

*Primary Examiner*—Peter Szekely
(74) *Attorney, Agent, or Firm*—Anthony A. Bisulca

(57) ABSTRACT

The invention relates to flame retardants which comprise titanium phosphinates and/or titanyl phosphinates of the formulae (I) and (II)

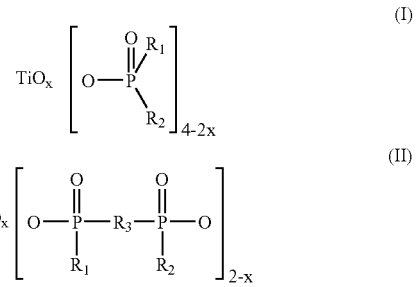

where $R_1$ and $R_2$ are identical or different and are unsubstituted or substituted linear or branched or cyclic $C_1$-$C_{10}$-alkyl groups or $C_6$-$C_{10}$-aryl, $C_7$-$C_{18}$-alkylaryl, or $C_7$-$C_{18}$-arylalkyl groups, and $R_3$ is an unsubstituted or substituted linear or branched or cyclic $C_1$-$C_{10}$-alkylene group, $C_6$-$C_{10}$-arylene, $C_7$-$C_{18}$-alkylarylene, or $C_8$-$C_{18}$-arylalkylene group, and x is a number from 0 to 1.9.

The invention also relates to molding compositions which comprise the inventive flame retardant.

36 Claims, No Drawings

TITANIUM-CONTAINING PHOSPHINATE FLAME RETARDANT

The invention relates to titanium-containing phosphinate flame retardants and to plastics molding compositions rendered flame-retardant thereby.

Salts of phosphinic acids (phosphinates) have proven to be effective flame-retardant additives for thermoplastic polymers. Initial descriptions applied in essence to alkali metal phosphinates, the flame-retardant action of which was claimed in polyester molding compositions (DE-A-2 252 258) and also in polyamides (DE-A-2 447 727). Subsequently, interest has centered especially on zinc salts (U.S. Pat. No. 4,180,495; U.S. Pat. No. 4,208,321), and also in more recent times on the phosphinates of calcium and of aluminum (EP-A-0 699 708; DE-A-1 96 07 635) as flame retardants of this type thought to have the best suitability.

In addition, synergistic combinations of phosphinates with certain nitrogen-containing compounds have been found, these being better flame retardants than the phosphinates alone in many instances (WO 97/39053, and also DE-A-197 34 437, and DE-A-197 37 727).

The preparation of titanium phosphinates and titanyl phosphinates is known. For example, various preparation methods have been described based on the reaction of phosphinic acids with titanium alkoxides, or else with titanium tetrachloride [G. H. Dahl, B. P. Block, Inorg. Chem. 6 (1967) 1439].

Surprisingly, it has now been found that titanium phosphinates and titanyl phosphinates have particularly good flame-retardant action in thermoplastic polymers, and are markedly superior to the phosphinates favored hitherto in their flame-retardant effects and other effects in polymers. This is all the more surprising because previous attempts have been made to determine which representatives of this class of substance have the best suitability. In addition, it has been found that combinations of these particular titanium phosphinates and titanyl phosphinates with the nitrogen compounds previously described as synergistic for other phosphinates (PCT/EP97/01664, and also DE-A-197 34 437, and DE-A-197 37 727), also have outstandingly good flame-retardant and other effects in thermoplastics.

The present invention therefore provides flame retardants which comprise titanium phosphinates and/or titanyl phosphinates of the formulae (I) and (II)

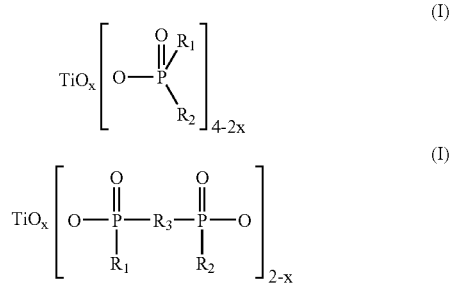

where $R_1$ and $R_2$ are identical or different and are unsubstituted or substituted linear or branched or cyclic $C_1$-$C_{10}$-alkyl groups or $C_6$-$C_{10}$-aryl, $C_7$-$C_{18}$-alkylaryl, or $C_7$-$C_{18}$-arylalkyl groups, and $R_3$ is an unsubstituted or substituted linear or branched or cyclic $C_1$-$C_{10}$-alkylene group, $C_6$-$C_{10}$-arylene, $C_7$-$C_{18}$-alkylarylene, or $C_8$-$C_{18}$-arylalkylene group, and x is a number from 0 to 1.9.

$R_1$ and $R_2$, identical or different, are preferably $C_1$-$C_6$-alkyl, linear or branched, and/or aryl.

$R_1$ and $R_2$, identical or different, are preferably methyl, ethyl, propyl, butyl, and/or phenyl.

$R_3$ is preferably a linear $C_1$-$C_6$-alkylene group, phenylene, or naphthylene.

$R_3$ is preferably methylene, ethylene, or propylene.

x is preferably a number from 0 to 1.5.

x is preferably 1.25 or 1.0 or 0.

The invention also provides molding compositions of thermoplastic or thermoset polymers which comprise, as flame retardant (component A), titanium phosphinates and titanyl phosphinates of the formulae (I) and (II)

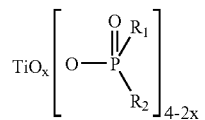

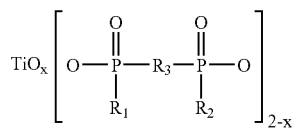

where $R_1$ and $R_2$ are identical or different and are unsubstituted or substituted linear or branched or cyclic $C_1$-$C_{10}$-alkyl groups or $C_6$-$C_{10}$-aryl, $C_7$-$C_{18}$-alkylaryl, or $C_7$-$C_{18}$-arylalkyl groups, and $R_3$ is an unsubstituted or substituted linear or branched or cyclic $C_1$-$C_{10}$-alkylene group, or $C_6$-$C_{10}$-arylene, $C_7$-$C_{18}$-alkylarylene, or $C_8$-$C_{18}$-arylalkylene group, and x is a number from 0 to 1.9.

$R_1$ and $R_2$, identical or different, are preferably $C_1$-$C_6$-alkyl, linear or branched, and/or aryl.

$R_1$ and $R_2$, identical or different, are particularly preferably methyl, ethyl, propyl, butyl, and/or phenyl.

$R_3$ is preferably a linear $C_1$-$C_6$-alkylene group, phenylene, or naphthylene.

$R_3$ is particularly preferably methylene, ethylene, or propylene.

x is preferably a number from 0 to 1.5.

x particularly preferably has a value of 1.25 or 1.0 or 0.

The molding compositions preferably comprise from 1 to 50% by weight of the flame retardant, based on the molding composition.

The molding compositions preferably comprise from 3 to 40% by weight of the flame retardant, based on the molding composition.

The molding compositions preferably comprise from 5 to 20% by weight of the flame retardant, based on the molding composition.

The invention also provides molding compositions of thermoplastic or thermoset polymers which comprise phosphinic salts of titanium in combination with compounds having synergistic action.

A feature of these molding compositions is that they comprise, or the flame retardant comprises, a phosphorus compound, nitrogen compound, or phosphorus-nitrogen compound, as component B.

Component B preferably comprises melamine phosphate, dimelamine phosphate, melamine pyrophosphate, melamine polyphosphates, melam polyphosphates, melem polyphosphates, and/or melon polyphosphates, and/or melamine condensates, such as melam, melem, and/or melon.

Another preferred component B comprises oligomeric esters of tris(hydroxyethyl) isocyanurate with aromatic polycarboxylic acids, benzoguanamine, tris(hydroxyethyl) isocyanurate, allantoin, glycoluril, melamine, melamine cyanurate, dicyandiamide, and/or guanidine.

Another preferred component B comprises nitrogen-containing phosphates of the formulae $(NH_4)_y H_{3-y} PO_4$ or $(NH_4 PO_3)_z$, where y is from 1 to 3 and z is from 1 to 10 000.

Another preferred component B comprises nitrogen compounds of the formulae (III) to (VIII), or a mixture of these,

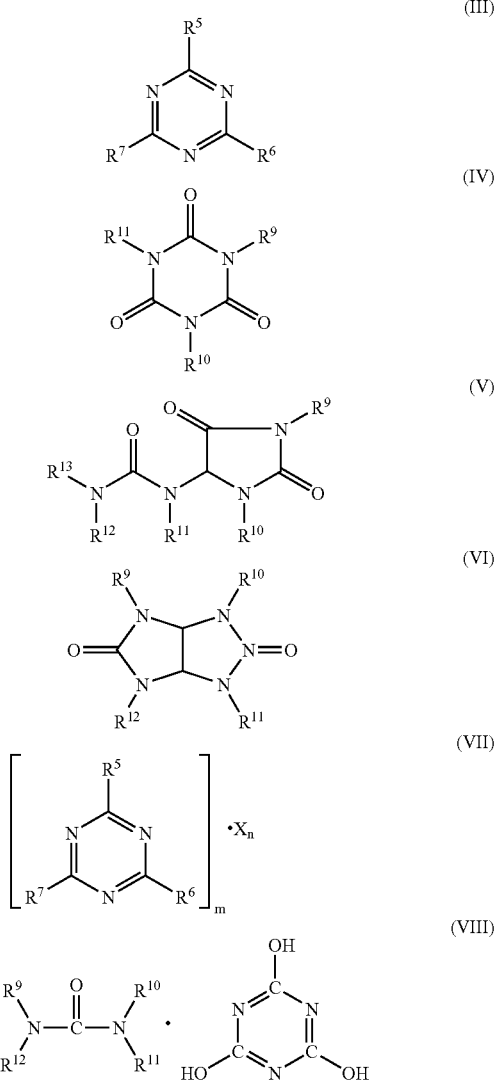

where
R$^5$ to R$^7$ are hydrogen, $C_1$-$C_8$-alkyl, $C_5$-$C_{16}$-cycloalkyl or -alkylcycloalkyl, unsubstituted or substituted with a hydroxy or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —OR$^8$, or —N(R$^8$)R$^9$, or else a system of N-alicyclic or N-aromatic nature,
R$^8$ is hydrogen, $C_1$-$C_8$-alkyl, $C_5$-$C_{16}$-cycloalkyl or -alkylcycloalkyl, unsubstituted or substituted with a hydroxy or a $C_1$-$C_4$-hydroxyalkyl function, $C_2$-$C_8$-alkenyl, $C_1$-$C_8$-alkoxy, -acyl, -acyloxy, or $C_6$-$C_{12}$-aryl or -arylalkyl,
R$^9$ to R$^{13}$ are the same as the groups for R$^8$, or else —O—R$^8$, m and n, independently of one another, are 1, 2, 3, or 4,
X is acids which can form adducts with triazine compounds (III).

Oligomeric esters of tris(hydroxyethyl) isocyanurate with aromatic polycarboxylic acids, as described in EP-A 0 584 567, can likewise be used as nitrogen compounds.

The molding composition preferably comprises from 1 to 30% by weight of component B, based on the molding composition.

The molding composition particularly preferably comprises from 5 to 15% by weight of component B, based on the molding composition.

The molding composition, or the flame retardant, preferably also comprises a synthetic inorganic compound and/or a mineral product, as component C.

Component C preferably comprises an oxygen compound of silicon, comprises magnesium compounds, comprises metal carbonates of metals of the second main group of the Periodic Table of the Elements, comprises red phosphorus, comprises zinc compounds, or comprises aluminum compounds.

The oxygen compounds of silicon comprise salts and esters of orthosilicic acid and condensates thereof, comprise silicates, zeolites and silicas, comprise glass, glass/ceramic, or ceramic powder; the magnesium compounds comprise magnesium hydroxide, hydrotalcites, magnesium carbonates, or magnesium calcium carbonates; the zinc compounds comprise zinc oxide, zinc stannate, zinc hydroxystannate, zinc phosphate, zinc borate, or zinc sulfides; the aluminum compounds comprise aluminum hydroxide or aluminum phosphate.

The molding composition, or the flame retardant, preferably comprises from 0.1 to 5% by weight of component C, based on the molding composition.

The molding composition, or the flame retardant, preferably comprises from 0.5 to 2% by weight of component C, based on the molding composition.

The inventive molding compositions preferably comprise those in which the thermoplastic polymers present are HI (High-impact) polystyrene, polyphenylene ethers, polyamides, polyesters, polycarbonates, or blends or polyblends of the type represented by ABS (acrylonitrile-butadiene-styrene), or PC/ABS (polycarbonate/acrylonitrile-butadiene-styrene), or PPE/HIPS (polyphenylene ether/HI polystyrene). HI polystyrene is a polystyrene with increased impact strength.

Particularly preferred thermoplastic polymers are polyamides, polyesters, and PPE/HIPS blends.

According to Hans Domininghaus in "Die Kunststoffe and ihre Eigenschaften" [Plastics and their properties], 5$^{th}$ edition (1998), p. 14, thermoplastic polymers are polymers whose molecular chains have no side branches, or else have a different number of side branches of varying length, and which soften when heated, and can be molded in almost any desired manner. Thermoplastic polymers which comprise the inventive flame retardant combinations and, where appropriate, fillers and reinforcing materials, and/or comprise other additives defined below are termed molding compositions.

The inventive flame-retardant thermoplastic polymers are preferably used for the production of polymer moldings, polymer films, polymer filaments, or polymer fibers, or else are used for the production of coatings or laminates.

In the inventive molding compositions, the thermoset polymers may comprise unsaturated polyester resins or epoxy resins.

These molding compositions are then preferably used for the production of coatings or laminates from thermoset resins.

The titanium phosphinates and titanyl phosphinates used according to the invention are prepared by methods known per se from titanium tetrachloride or titanium alkoxides, such as titanium tetrabutoxide, and phosphinic acids or their salts or esters. Depending on the phosphinic acid used, quantitative proportion of titanium compound to phosphinic acid, and method of preparation, the product is either pure titanium phosphinates or titanyl phosphinates, i.e. titanium/phosphinic acid compounds in which some of the titanium is in oxidized form. The latter are produced mainly when the preparation takes place in an aqueous medium.

The phosphinates of titanium may be in monomeric form or be coordination polymers in which a polymeric network having titanium as central atom is built up by the phosphinic acids, as bidentate chelating ligands, and, where appropriate, by the presence of oxide bridges.

Suitable titanium compounds for preparing the titanium phosphinates are the commercially available products titanium tetrachloride and titanium tetrabutoxide.

Examples of phosphinic acids which are a suitable constituent of the inventive titanium phosphinates and titanyl phosphinates are dimethylphosphinic acid, ethylmethylphosphinic acid, diethylphosphinic acid, ethylbutylphosphinic acid, dipropylphosphinic acid, methyl-n-propylphosphinic acid, ethane-1,2-di(methylphosphinic acid), methanedi(methylphosphinic acid), hexane-1,6-di(methylphosphinic acid), benzene-1,4-di(methylphosphinic acid), methylphenylphosphinic acid, diphenylphosphinic acid.

The phosphinic acids preferably comprise methylethylphosphinic acid, diethylphosphinic acid, or ethane-1,2-di(methylphosphinic acid).

The amount of the titanium phosphinate or titanyl phosphinate to be added to the polymers may vary widely. Use is generally made of from 1 to 50% by weight, based on the plastics molding composition. The ideal amount depends on the flame retardancy specification to be achieved, on the nature of the polymer, and, where appropriate, on the presence of other flame retardants or synergists, such as the nitrogen compounds described above. Preferred amounts, based on the plastics molding composition, are from 3 to 40% by weight, in particular from 5 to 20% by weight.

Depending on the nature of the polymer used and on the properties desired, the abovementioned titanium phosphinates or titanyl phosphinates may be used in various physical forms for the preparation of the inventive molding compositions. For example, to achieve better dispersion in the polymer the phosphinic salts may be ground to give a fine-particle form. Mixtures of various phosphinic salts may also be used, if desired.

The phosphinic salts of the invention are thermally stable, and neither decompose the polymers during processing nor affect the process of preparing the plastics molding composition. The phosphinic salts are not volatile under the conventional conditions for preparation of thermoplastic polymers or for their processing.

The amount of component B to be added, where appropriate, to the polymers may vary widely. Use is generally made of from 1 to 30% by weight, based on the plastics molding composition. The ideal amount depends on the flame retardancy specification to be achieved, on the nature of the polymer, and on the type of component B used. Preferred amounts are from 1 to 30% by weight, in particular from 5 to 15% by weight.

To prepare the molding compositions, the inventive titanium phosphinates and titanyl phosphinates, or a mixture of these, may be incorporated with component B into (thermoplastic) polymers by, for example, premixing all of the constituents in powder and/or pellet form in a mixer and then homogenizing them in a compounding assembly (e.g. a twin-screw extruder) within the polymer melt. The melt is usually drawn off as an extrudate, cooled and pelletized. The components may also be introduced separately by way of a metering system directly into the compounding assembly.

It is also possible to admix the flame-retardant additives with ready-to-use polymer pellets or ready-to-use polymer powder, and process the mixture directly in an injection-molding machine to give moldings.

In the case of polyesters, for example, the flame-retardant additives may also be added to the polyester composition before the end of the polycondensation process.

Alongside the inventive flame-retardant substances, fillers and reinforcing materials may also be added to the molding compositions, examples being glass fibers, glass beads, or minerals, such as chalk. The molding compositions may also comprise other additives such as antioxidants, light stabilizers, lubricants, colorants, nucleating agents, or antistatic agents. EP-A-0 584 567 gives examples of the additives which may be used.

The flame-retardant plastics molding compositions are suitable for the production of moldings, films, filaments, or fibers, e.g. via injection molding, extrusion, or pressing.

If the intention is to prepare thermoset molding compositions, various processes are available for this purpose. By way of example, a thermoset resin may be mixed with the inventive flame retardant and, where appropriate, components B and C, the resultant mixture then being wet-pressed (cold pressing) at pressures of from 3 to 10 bar and temperatures of from 20 to 80° C.

As an alternative, this wet pressing may also take place at pressures of from 3 to 10 bar and temperatures of from 80 to 150° C. (warm or hot pressing).

Finally, it is also possible to mix a thermoset resin with the inventive flame retardant and, where appropriate, components B and C, and then manufacture synthetic resin mats from the resultant mixture at pressures of from 50 to 150 bar and temperatures of from 140 to 160° C.

EXAMPLES

1. Preparation of Titanium Phosphinates

Preparation of titanyl phosphinate from titanium tetrabutoxide, where $R_1$ and $R_2$=ethyl and the empirical formula corresponds to x=1 in formula (I):

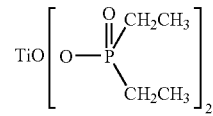

244 g (2 mol) of diethylphosphinic acid and 340 g (1 mol) of titanium tetrabutoxide are heated at 130-140° C. for 4 h, with reflux of the resultant butanol. The solution produced is then introduced into 2.5 l of boiling water and heated at boiling for a further 30 min. The resultant solid is filtered off and dried at 175° C. This gives 332 g of titanyl bis(diethylphosphinate) (=96% of theory) in the form of a white powder whose melting point is above 300° C. Elemental analysis: phosphorus (found: 19.8%; calculated: 20.1%); titanium: (found: 15.6%; calculated: 15.6%).

1.2. Preparation of titanyl phosphinate from titanium tetrachloride where $R_1$ and $R_2$=ethyl and the empirical formula corresponds to x=1.25 in formula (I):

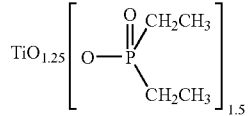

190 g (1 mol) of titanium tetrachloride are slowly added to a solution of 183 g (1.5 mol) of diethylphosphinic acid in 400 ml of water, with stirring and external ice cooling. The resultant clear solution is neutralized by addition of 320 g of 50% strength sodium hydroxide solution after addition of a further 300 ml of water, and heated at boiling for 2 h. The solid resulting from the neutralization is filtered off, taken up in 600 ml of freshly introduced water and heated at reflux for a further 20 h to release residual chloride. After cooling, the solid is filtered off and vacuum-dried at 130° C. and 30 mbar. This gives 196 g of titanyl bis(diethylphosphinate) (=78% of theory) in the form of a white powder whose melting point is above 300° C. Elemental analysis: phosphorus (found: 18.1%; calculated: 18.5%); titanium: (found: 19.3%; calculated: 19.1%).

1.3. Preparation of titanium phosphinate from titanium tetrabutoxide where $R_1$ and $R_2$=ethyl and the empirical formula corresponds to x=0 in formula (I):

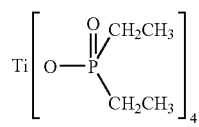

122 g (1 mol) of diethylphosphinic acid and 85 g (0.25 mol) of titanium tetrabutoxide are heated at reflux in 500 ml of toluene for 40 h. During this period, about 100 ml of the toluene is distilled off after each 8 h together with the butanol produced and replaced by freshly introduced toluene. The resultant solution is then freed from the solvent used. This gives 132 g of titanium tetrakis(diethylphosphinate) (=100% of theory) in the form of a high-viscosity liquid. Elemental analysis: phosphorus (found: 22.0%; calculated: 23.1%); titanium: (found: 8.7%; calculated: 8.9%).

2. Components Used 2.1. Commercially available polymers (pellets):

| | |
|---|---|
| Nylon-6 (GRPA 6): | ® Durethan BKV 30 (Bayer AG, D) comprising 30% of glass fibers. |
| Nylon-6,6 (GRPA 6.6): | ® Durethan AKV 30 (Bayer AG, D) comprising 30% of glass fibers. |
| Polybutylene terephthalate (GRPBT): | ® Celanex 2300 GV1/30 (Ticona, D) comprising 30% of glass fibers. |

2.2. Flame retardant compositions (pulverulent):

Aluminum salt of diethylphosphinic acid, hereinafter termed DEPAL.

Melapur® MC (melamine cyanurate), DSM Melapur, NL

Melapur 200 (melamine polyphosphate), DSM Melapur, NL

Titanyl phosphinate of Example 1.1., hereinafter termed DEPTi (x=1).

Titanyl phosphinate of Example 1.2., hereinafter termed DEPTi (x=1.25).

Titanium phosphinate of Example 1.3., hereinafter termed DEPTi (x=0). Zinc salt of diethylphosphinic acid, hereinafter termed DEPZN.

3. Preparation, Processing, and Testing of Flame-Retardant Plastics Molding Compositions The flame retardant components were mixed in the ratio given in the tables with the polymer pellets and optionally with additives, and incorporated in a twin-screw extruder (Leistritz LSM 30/34) at temperatures of from 240 to 280° C. (GRPBT and GRPA 6) or from 260 to 300° C. (GRPA 6.6). The homogenized polymer extrudate was drawn off, cooled in a water bath, and then pelletized.

After adequate drying, the molding compositions were processed in an injection-molding machine (Toshiba IS 100 EN) at melt temperatures of from 260 to 280° C. (GRPBT and GRPA 6) or from 270 to 300° C. (GRPA 6.6) to give test specimens, and tested and classified for flame retardancy on the basis of UL 94 (Underwriters Laboratories) test.

Table 1 shows comparative examples in which the aluminum salt of diethylphosphinic acid (DEPAL) or the zinc salt of diethylphosphinic acid (DEPZn) or melamine polyphosphate or melamine cyanurate were tested as sole flame retardant components in glass-fiber-reinforced PA6, PA 6.6 or PBT.

Table 2 shows comparative examples in which the aluminum salt of diethylphosphinic acid or the zinc salt of diethylphosphinic acid were tested in combination with nitrogen-containing synergists as described in PCT/WO 97/01664 in glass-fiber-reinforced PA6, PA 6.6 or PBT.

The results of the examples in which titanium phosphinates or titanyl phosphinates of the invention were used are listed in Table 3. All of the amounts are given as % by weight, and are based on the plastics molding composition including the flame retardants.

The examples show that the flame-retardant action of the titanium salts or titanyl salts of the phosphinates of the invention is markedly better in thermoplastic polymers than that of the phosphinates described hitherto. The amount, based on the plastics molding composition, of flame retardant needed to achieve a V-0, V-1, or V-2 classification can be markedly reduced when use is made of the inventive titanium phosphinates or titanyl phosphinates.

The amount to be used of flame retardant to achieve a particular fire classification can therefore be reduced considerably, and this not only has a favorable effect on the mechanical characteristics of the plastics molding composition but also has associated environmental and economic advantages.

TABLE 1

Comparative examples
Each of: Aluminum phosphinates or zinc phosphinates or melamine polyphosphate or melamine cyanurate alone in glass-fiber-reinforced PBT or PA 6.6.

| Polymer | DEPAL [%] | DEPZN [%] | Melamine polyphosphate [%] | Melamine cyanurate [%] | UL 94 classification (1.6 mm) | Afterflame times**[)] [s] |
|---|---|---|---|---|---|---|
| GRPBT | 17 | | | | V-1 | 12/10 |
| GRPBT | | 20 | | | V-2 | 10/5 |
| GRPBT | | | 20 | | V-2 | 11/5 |
| GRPBT | | | | 25 | n.c.*[)] | 34/9 |

TABLE 1-continued

Comparative examples
Each of: Aluminum phosphinates or zinc phosphinates
or melamine polyphosphate or melamine cyanurate
alone in glass-fiber-reinforced PBT or PA 6.6.

| Polymer | DEPAL [%] | DEPZN [%] | Melamine polyphosphate [%] | Melamine cyanurate [%] | UL 94 classification (1.6 mm) | Afterflame times**) [s] |
|---|---|---|---|---|---|---|
| GRPA 6 | 20 | | | | V-2 | 8/15 |
| GRPA 6.6 | 20 | | | | n.c.*) | 17/27 |
| GRPA 6.6 | 25 | | | | n.c.*) | 10/27 |
| GRPA 6.6 | | 20 | | | V-2 | 14/4 |
| GRPA 6.6 | | | | 20 | V-2 | 19/7 |

*) n.c. = not classifiable
**) average flame times after 1st/2nd flame application (5 test specimens)

TABLE 2

Comparative Examples
Aluminum phosphinate or zinc phosphinate in combination with
nitrogen-containing synergists in glass-fiber-reinforced PBT or PA 6.6.

| Polymer | DEPAl [%] | DEPZn [%] | Melamine cyanurate [%] | Melamine polyphosphate [%] | UL 94 classification (1.6 mm) | Afterflame times**) [s] |
|---|---|---|---|---|---|---|
| GRPBT | | 10 | 10 | | n.c.*) | 25/20 |
| GRPBT | | 10 | | 10 | V-2 | 5/3 |
| GRPA 6.6 | 20 | | 10 | | n.c.*) | 2/53 |

*) n.c. = not classifiable
**) average flame times after 1st/2nd flame application (5 test specimens)

TABLE 3

Invention.
Titanium phosphinate or titanyl phosphinate alone or in combination
with melamine cyanurate in glass-fiber-reinforced PBT or PA 6.6.

| Polymer | DEPTi (x = 1) [%] | DEPTi (x = 1.25) [%] | DEPTi (x = 0) [%] | Melamine cyanurate [%] | UL 94 classification (1.6 mm) | Afterflame times**) [s] |
|---|---|---|---|---|---|---|
| GRPBT | 15 | | | | V-1 | 3/12 |
| GRPBT | | 15 | | | V-1 | 3/8 |
| GRPBT | | | 15 | | V-1 | 1/8 |
| GRPBT | 10 | | | 10 | V-0 | 2/2 |
| GRPBT | | 10 | | 10 | V-0 | 1/1 |
| GRPBT | | | 10 | 10 | V-0 | 1/2 |
| GRPA 6 | | | 15 | | V-0 | 1/3 |
| GRPA 6.6 | 20 | | | | V-0 | 0/1 |
| GRPA 6.6 | | 20 | | | V-0 | 0/0 |
| GRPA 6.6 | | | 20 | | V-0 | 0/0 |

*) n.c. = not classifiable
**) average flame times after 1st/2nd flame application (5 test specimens)

The invention claimed is:

1. A flame retardant comprising a titanyl phosphinate of the formulae (I) or (II)

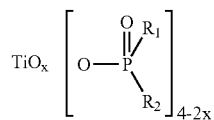
(I)

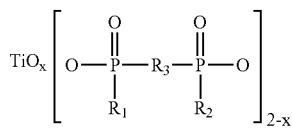
(II)

where $R_1$ and $R_2$ are identical or different and methyl, ethyl, propyl, butyl, or phenyl, and $R_3$ is an unsubstituted or substituted linear or branched or cyclic $C_1$-$C_{10}$-alkylene group, $C_6$-$C_{10}$-arylene, $C_7$-$C_{18}$-alkylarylene, or $C_8$-$C_{18}$-arylalkylene group, and x is a number from 1.25 to 1.9.

2. The flame retardant as claimed in claim 1, wherein $R_3$ is a linear $C_1$-$C_6$-alkylene group, phenylene, or naphthylene.

3. The flame retardant as claimed claim 1, wherein $R_3$ is methylene, ethylene, or propylene.

4. The flame retardant as claimed in claim 1, wherein x is a number from 1.25 to 1.5.

5. The flame retardant as claimed in claim 1, wherein x is 1.25.

6. A molding composition comprising a thermoplastic or thermoset polymer and a flame retardant (component A), wherein component A is a titanyl phosphinate of the formulae (I) or (II)

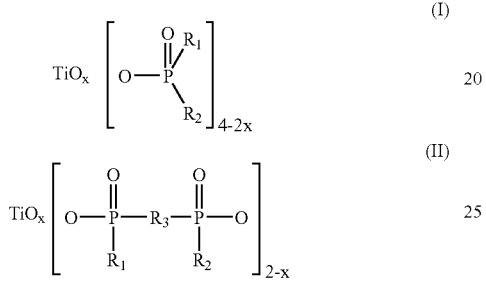

where $R_1$ and $R_2$ are identical or different and are methyl, ethyl, propyl, butyl, or phenyl, and $R_3$ is an unsubstituted or substituted linear or branched or cyclic $C_1$-$C_{10}$-alkylene group, $C_6$-$C_{10}$-arylene, $C_7$-$C_{18}$-alkylarylene, or $C_8$-$C_{18}$-arylalkylene group, and x is a number from 1.25 to 1.9.

7. The molding composition as claimed in claim 6, wherein $R_3$ is a linear $C_1$-$C_6$-alkylene group, phenylene, or naphthylene.

8. The molding composition as claimed in claim 6, wherein $R_3$ is methylene, ethylene, or propylene.

9. The molding composition as claimed in claim 6, wherein x is a number from 1.25 to 1.5.

10. The molding composition as claimed in claim 6, wherein x is 1.25.

11. The molding composition as claimed in claim 6, further comprising from 1 to 50% by weight of the flame retardant, based on the molding composition.

12. The molding composition as claimed in claim 6, further comprising from 3 to 40% by weight of the flame retardant, based on the molding composition.

13. The molding composition as claimed in claim 6, further comprising from 5 to 20% by weight of the flame retardant, based on the molding composition.

14. The molding composition as claimed in claim 6, further comprising, as component B, a phosphorus compound, nitrogen compound, or phosphorus-nitrogen compound.

15. The molding composition as claimed in claim 14, wherein component B is melamine phosphate, dimelamine phosphate, melamine pyrophosphate, melamine polyphosphates, melam polyphosphates, melem polyphosphates, melon polyphosphates, or melamine condensates.

16. The molding composition as claimed in claim 14, wherein component B is an oligomeric ester of tris(hydroxyethyl) isocyanurate with aromatic polycarboxylic acids, benzoguanamine, tris(hydroxyethyl) isocyanurate, allantoin, glycoluril, melamine, melamine cyanurate, dicyandiamide or guanidine.

17. The molding composition as claimed in claim 14, wherein component B is at least one nitrogen-containing phosphate of the formulae $(NH_4)_y H_{3-y} PO_4$ or $(NH_4 PO_3)_z$, where y is from 1 to 3 and z is from 1 to 10 000.

18. The molding composition as claimed in claim 14, wherein component B is a nitrogen compound of the formulae (III) to (VIII), or a mixture thereof,

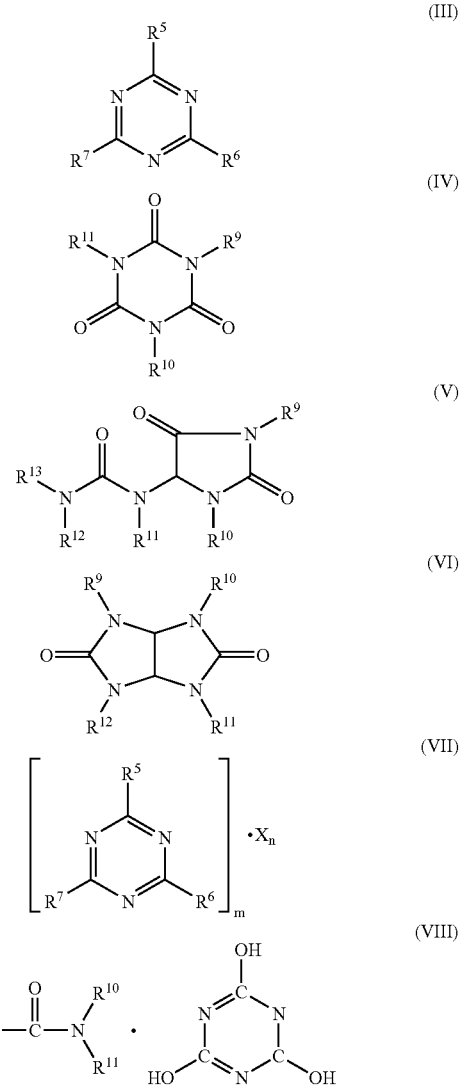

where
$R^5$ to $R^7$ are hydrogen, $C_1$-$C_8$-alkyl, $C_5$-$C_{16}$-cycloalkyl or -alkylcycloalkyl, unsubstituted or substituted with a hydroxy or a $C_1$-$C_4$-hydroxyalkyl function, $C_2$-$C_8$-alkenyl, $C_1$-$C_8$-alkoxy, -acyl, -acyloxy, $C_8$-$C_{12}$-aryl or -arylalkyl, —$OR^8$, —$N(R^8)R^9$, or a system of N-alicyclic or N-aromatic nature, $R^8$ is hydrogen, $C_1$-$C_8$-alkyl, $C_5$-$C_{16}$-cycloalkyl or -alkylcycloalkyl, unsubstituted or substituted with a hydroxy or a $C_1$-$C_4$-hydroxyalkyl function, $C_2$-$C_8$-alkenyl, $C_1$-$C_8$-alkoxy, -acyl, -acyloxy, or $C_6$-$C_{12}$-aryl or -arylalkyl, $R^9$ to $R^{13}$ are the same as the groups for $R^8$, or —O—$R^8$, m and n, independently of one another, are 1, 2, 3, or 4, X is an acid which forms adducts with triazine compounds (III).

19. The molding composition as claimed in claim 14, comprising from 1 to 30% by weight of component B, based on the molding composition.

20. The molding composition as claimed in claim 14, comprising from 5 to 15% by weight of component B, based on the molding composition.

21. The molding composition as claimed in claim 6 further comprising, as component C, at least one of a synthetic inorganic compound or a mineral product.

22. The molding composition as claimed in claim 21, wherein component C is an oxygen compound of silicon, a magnesium compound, a metal carbonate of metals of the second main group of the Periodic Table of the Elements, red phosphorus, a zinc compound, or an aluminum compound.

23. The molding composition as claimed in claim 22, wherein the oxygen compound of silicon is selected from the group consisting of salts and esters of orthosilicic acid or condensates thereof, silicates, zeolites and silicas, glass, glass/ceramic, and ceramic powder; wherein the magnesium compound is selected from the group consisting of magnesium hydroxide, hydrotalcites, magnesium carbonates, and magnesium calcium carbonates; wherein the zinc compound is selected from the group consisting of zinc oxide, zinc stannate, zinc hydroxystannate, zinc phosphate, zinc borate, and zinc sulfides; and wherein the aluminum compound is aluminum hydroxide or aluminum phosphate.

24. The molding composition as claimed in claim 21, further comprising from 0.1 to 5% by weight of component C, based on the molding composition.

25. The molding composition as claimed in claim 21, further comprising from 0.5 to 2% by weight of component C, based on the molding composition.

26. The molding composition as claimed claim 6, wherein the thermoplastic polymer is selected from the group consisting of HI (High-Impact) polystyrene, polyphenylene ethers, polyamides, polyesters, polycarbonates, and blends or polyblends of the type represented by ABS (acrylonitrile-butadiene-styrene), PC/ABS (polycarbonate/acrylonitrile-butadiene-styrene), or PPE/HIPS (polyphenylene ether/HI polystyrene).

27. The molding composition as claimed in claim 6, wherein the thermoplastic polymer is a polyamide, polyester, or PPE/HIPS blends.

28. The molding composition as claimed in claim 6, wherein the thermoset polymer is an unsaturated polyester resin or an epoxy resin.

29. The molding composition as claimed in claim 6, wherein component A further comprises a phosphorus compound, nitrogen compound, or phosphorus-nitrogen compound.

30. A polymer article comprising at least one thermoplastic polymer and a flame retardant according to claim 1, wherein the polymer article is selected from the group consisting of polymer moldings, polymer films, polymer filaments, and polymer fibers.

31. A coating or laminate comprising at least one thermoplastic polymer and a flame retardant as claimed in claim 1.

32. A coating or laminate comprising at least one thermoset polymer and a flame retardant as claimed in claim 1.

33. The coating or laminate as claimed in claim 32, wherein the at least one thermoset resin is an unsaturated polyester resin or an epoxy resin.

34. The molding composition as claimed in claim 21, wherein component A further comprises at least one of a synthetic inorganic compound or a mineral product.

35. A flame retardant comprising a titanyl phosphinate of the formulae (II)

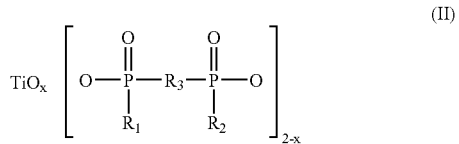

where $R_1$ and $R_2$ are identical or different and methyl, ethyl, propyl, butyl, or phenyl, and $R_3$ is an unsubstituted or substituted linear or branched or cyclic $C_1$-$C_{10}$-alkylene group, $C_6$-$C_{10}$-arylene, $C_7$-$C_{18}$-alkylarylene, or $C_8$-$C_{18}$-arylalkylene group, and x is a number from 1 to 1.9.

36. A flame retardant comprising a titanyl phosphinate of the formulae (I)

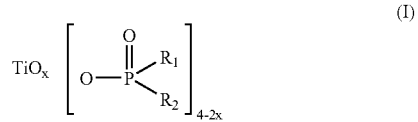

where $R_1$ and $R_2$ are identical or different and methyl, ethyl, propyl, butyl, or phenyl, and $R_3$ is an unsubstituted or substituted linear or branched or cyclic $C_1$-$C_{10}$-alkylene group, $C_6$-$C_{10}$-arylene, $C_7$-$C_{18}$-alkylarylene, or $C_8$-$C_{18}$-arylalkylene group, and x is a number from 1.25 to 1.9.

* * * * *